US009063525B2

(12) United States Patent
Sanders et al.

(10) Patent No.: US 9,063,525 B2
(45) Date of Patent: Jun. 23, 2015

(54) DISTRIBUTED ENERGY SERVICES MANAGEMENT SYSTEM

(71) Applicant: SUNVERGE ENERGY, INC., Stockton, CA (US)

(72) Inventors: Dean Sanders, Linden, CA (US); Stuart Statman, San Francisco, CA (US)

(73) Assignee: SUNVERGE ENERGY, INC., Stockton, CA (US)

( * ) Notice: Subject to any disclaimer, the term of this patent is extended or adjusted under 35 U.S.C. 154(b) by 9 days.

(21) Appl. No.: 13/774,531

(22) Filed: Feb. 22, 2013

(65) Prior Publication Data

US 2013/0166081 A1 Jun. 27, 2013

Related U.S. Application Data

(63) Continuation-in-part of application No. 13/016,901, filed on Jan. 28, 2011, now Pat. No. 8,463,449.

(51) Int. Cl.
G05D 3/12 (2006.01)
G05D 5/00 (2006.01)
G05D 9/00 (2006.01)
G05D 11/00 (2006.01)
G05D 17/00 (2006.01)
G05B 11/01 (2006.01)

(52) U.S. Cl.
CPC ..................................... G05B 11/01 (2013.01)

(58) Field of Classification Search
CPC ........................................................ G05B 11/01
USPC .................. 700/287, 286, 291, 293, 294, 295
See application file for complete search history.

(56) References Cited

U.S. PATENT DOCUMENTS

| 8,024,073 | B2 | 9/2011 | Imes et al. | |
| 2004/0024483 | A1* | 2/2004 | Holcombe | 700/122 |
| 2007/0227574 | A1* | 10/2007 | Cart | 136/206 |
| 2008/0167756 | A1* | 7/2008 | Golden et al. | 700/297 |
| 2010/0156665 | A1 | 6/2010 | Krzyzanowski et al. | |
| 2010/0289643 | A1 | 11/2010 | Trundle | |
| 2010/0327800 | A1 | 12/2010 | Reineccius | |
| 2011/0046800 | A1* | 2/2011 | Imes et al. | 700/286 |
| 2011/0093127 | A1* | 4/2011 | Kaplan | 700/292 |
| 2011/0118894 | A1 | 5/2011 | Reineccius et al. | |
| 2012/0065796 | A1* | 3/2012 | Brian et al. | 700/295 |
| 2012/0197449 | A1 | 8/2012 | Sanders | |

FOREIGN PATENT DOCUMENTS

| NO | WO0195177 | 12/2001 |
| WO | WO2004070907 | 8/2004 |
| WO | WO2010101963 | 9/2010 |

(Continued)

Primary Examiner — Mohammad Ali
Assistant Examiner — Ziaul Karim
(74) Attorney, Agent, or Firm — Michael W. Caldwell; Matlock Law Group, PC

(57) ABSTRACT

Systems and methods for distributed energy services management are disclosed. A particular embodiment includes: receiving an input command via a network interface at a site gateway, the input command including information for controlling one or more physical devices at a site; converting, by use of a data processor, the input command to a virtualized command in a common command format; executing, by use of the data processor, one or more executor modules to cause execution of one or more corresponding virtual devices associated with the virtualized command; and using the executed one or more virtual devices to control the corresponding one or more physical devices at the site.

14 Claims, 10 Drawing Sheets

(56) References Cited

FOREIGN PATENT DOCUMENTS

| | | |
|---|---|---|
| WO | WO2010111433 | 9/2010 |
| WO | WO2011008505 | 1/2011 |
| WO | WO2011008506 | 1/2011 |
| WO | WO2012008979 | 1/2012 |

* cited by examiner

DISTRIBUTED ENERGY SERVICES MANAGEMENT SYSTEM

PRIORITY PATENT APPLICATION

This is a continuation-in-part patent application of co-pending U.S. patent application Ser. No. 13/016,901; filed Jan. 28, 2011; and titled, "Systems, Apparatus, and Methods of a Solar Energy Grid Integrated System with Energy Storage Appliance" by the same applicant. This present patent application draws priority from the referenced patent application. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2010-2013, Sunverge Inc., All Rights Reserved.

TECHNICAL FIELD

This patent document pertains generally to tools (systems, apparatuses, methodologies, computer program products, etc.) for distributed energy services management.

BACKGROUND

There exist several technologies that can produce electricity on a premises, whether a residential or commercial building. Among these are photovoltaic panels (e.g., solar panels), small scale natural gas turbines (also known as micro-turbines), small-scale wind turbines (in contrast to the large turbines used in grid connected wind farms), low pressure water turbines, high-pressure low flow water turbines, and fuel cells using hydrogen, natural gas, and potentially other hydrocarbons. These technologies are herein referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a home or business' main source of electricity, which is normally provided from a utility power grid connected to the home or business and are designed to support the entire or selected electrical load of the home or business. As a result, residential and commercial power storage and supply devices are typically very large and cumbersome. Some power storage and supply devices use alternative energy sources, such as the ones listed above. The power storage and supply devices store the electric power produced by an alternative energy source and may even supply power to a utility power grid, in essence operating as a small, distributed power generation plant. Many local, state, and federal government agencies, as well as private utility companies, are encouraging this practice as evidenced by the changing regulatory environment and passage of such distributed power and energy storage policies as AB970, SB412, SB 14 and AB44. Further, rule makers such as FERC, CASIO, and the CPUC are making priority changes (e.g., CEC Integrated Energy Policy Report, CAISO implementation of FERC Order 719, etc.), which encourage or mandate the use of distributed energy storage and power generation. Unfortunately, the use of alternative energy sources in conjunction with such power storage and supply device systems has been limited primarily because of cost and convenience and communications standards.

In recent years, however, the costs associated with adopting and using alternative energy sources has decreased substantially as distributed energy power and storage technologies have been refined, sales have increased due to the creation of new markets (e.g., plug-in electric hybrid vehicles and the globalized adoption of solar technologies), and more suppliers have entered the market resulting in greater manufacturing capacity and market competitiveness for both photovoltaic and battery manufacturers. The cost barriers to distributed electrical technologies are also eroding due to factors such as real and/or perceived increases in the cost of electricity and other forms of energy, the widespread adoption of time-of-use pricing (TOU) or real-time pricing (RTP) by utilities, favorable terms for the utilities' purchase of power from such distributed sources, and government financial incentives (e.g., The federal business energy investment tax credit available under 26 USC §48 was expanded significantly by the Energy Improvement and Extension Act of 2008 (H.R. 1424), enacted in October 2008, etc.) which encourage investment in distributed and environmentally more benign electrical technologies.

Adoption of distributed energy power and storage technologies is also increasing due to the widespread implementation of an Advanced Metering Infrastructure; commonly referred to as AMI. Advanced metering systems are comprised of state-of-the-art electron/digital hardware and software, which combine interval data measurement with continuously available remote communications. These systems enable measurement of detailed, time-based information and frequent collection and transmittal of such information to various parties. AMI typically refers to the full measurement and collection system that includes meters at the customer site, communication networks between the customer and a service provider, such as an electric, gas, or water utility, and data reception and management systems that make the information available to the service provider. With AMI utilities are now better able to manage installed devices within the homes of participating consumers that, under utility control, selectively disable energy-consuming devices (e.g., hot water heaters or air conditioning units) in response to peak loading conditions. Furthermore, utilities are now able in certain cases to remotely activate and aggregate distributed power and energy supplies to increase the supply of electricity to constrained parts of the electricity grid.

There has been an increasing emphasis in recent years on energy conservation. Electric utilities have also come under increasing pressure to reduce the need to fire up polluting power plants to serve peak demands, such as during hot summer days. With the enactment of current legislation and rulemaking (e.g., AB970, AB32, and FERC Order 719, etc.), electric utilities also have an incentive to "smooth out" energy demand to minimize the need to install new power transmission and distribution lines; further negating environmental and land use issues. Examples of a few of the ways in which utilities can perform these tasks are referred to as "demand side management" and "supply side management." Demand side management refers to the selective reduction of energy demand in response to peak loading conditions. For example, utilities have for years installed devices in the homes of participating consumers that, under utility control, selectively disable energy-consuming devices (e.g., hot water heaters or air conditioning units) in response to peak loading conditions. As another example, utilities are able in certain cases to remotely activate energy supplies to increase the supply of electricity to parts of the electricity grid. It would be advantageous to provide more sophisticated control mechanisms to permit electric utilities and others to effectively monitor and control distributed energy resources, such as storage units capable of storing electricity and reselling it to the grid on command. It would also be advantageous to provide more sophisticated demand side management tasks using aggregated resources to manage localized constraints on the utility grid (e.g., substation, feeder-line, residence, etc.).

SUMMARY

Systems and methods for distributed energy services management are disclosed. An edge gateway system includes a programming platform or environment for receiving command/control data and configuration data from a variety of sources and for dynamically controlling actions and state in a plurality of physical devices connected to the platform via a data communications interface. In a particular embodiment, the data communications interface can be implemented as a Controller Area Network (CAN) bus, Web services, ModBus, or other conventional data communications interface and/or protocol.

A set of command channels is provided on the platform to receive commands for driving modes, actions, and device state in the plurality of physical devices represented by a plurality of corresponding virtual device modules or virtual devices. The command channels can provide an input port for commands in a particular format or protocol. Different command channels can handle different formats or protocols. The plurality of command channels are processed by one or more command translators that convert the various formats/protocols to a common format that can be used by one or more executor modules of a set of executor modules to cause execution of one or more corresponding virtual device(s). In an example embodiment, there are multiple executor modules. The executor modules are typically command specific; however, a single command can be handled by multiple executor modules.

The virtual device acts like a device driver to translate common format commands to control signals for driving a particular type of physical device to a desired state. The virtual device also collects status information from the physical device for transfer to the network cloud as part of a device report. The virtual device(s) can communicate with the corresponding physical devices via the data communications interface (e.g., the CAN bus, Web service, ModBus, or equivalent). Each virtual device can execute other virtual devices. As a result, the set of virtual devices can be executed in a hierarchical fashion.

The platform can include a plurality of programs, which are installable and configurable on the platform. The programs can each implement a mode or policy in the set of virtual devices. Programs interact directly with the virtual devices. Each program can cause one or more corresponding virtual device(s) to implement the corresponding mode. The programs are each assigned a unique priority relative to other programs. An action by a lower priority program can be pre-empted by a higher priority program. The plurality of programs is scheduled for execution in priority order.

Each program can be assigned to a specified portion of a resource, such as a battery. For example, a program (e.g., Program A) can be assigned to a 40% portion of a battery. Given this assignment, the actions of other programs cannot affect the 40% of the battery assigned to Program A. If a resource is not fully allocated (e.g., 40% is assigned to Program A and 10% is assigned to Program B), any program can use the unallocated capacity of the resource. As a result, if Program A is assigned 40% of the battery and Program B is assigned 10% of the battery, Program A can affect 90% of the battery (e.g., 40% assigned to Program A plus the unassigned 50%), Program B can affect 60% of the battery (e.g., 10% assigned to Program B plus the unassigned 50%), and other programs can only affect the unassigned 50% of the battery. Moreover, a particular embodiment is further configured to enable assignment or reservation of the individual capacities of a resource. For example, a particular resource, such as a battery, may have a charge capacity and a discharge capacity. An example embodiment can be configured to enable a particular program, such as Program A, to reserve a portion (e.g., 40%) of the discharge capacity of the resource, but separately none (or some, or all) of the charge capacity of the resource. This feature of the example embodiment allows for a program to reserve a portion of the discharge capacity of a resource, while allowing other programs to separately reserve a portion of the charge capacity of the resource. The interaction between programs with resource capacity reservations is implemented in the same manner as the interaction between programs with resource reservations as described above. The partial resource and resource capacity allocation feature of an example embodiment enables the scope of program operation to be configurable and controllable.

Each program can also be associated with a particular external entity, or a combination thereof. For example, a program can be associated with a consumer, a site owner, a unit operator, a utility, a component supplier, or other external entity or a combination thereof. As a result, the set of programs on the platform, and their collective operational activity, can be grouped by the associated external entities.

Each program can implement a mode or policy in the set of virtual devices using any of a variety of available program models. For example, the plurality of available program models can include: an override process, a sequence, a timeline, or a schedule. It will be apparent to those of ordinary skill in the art that many other program models can be provided and used. In the example embodiment, the override process sends control commands to the corresponding set of virtual devices for commanding the virtual devices to transition immediately to the specified state. The sequence process initiates a serial set of actions based on a relative time from an initial starting point in time. The set of actions include commanding the virtual devices to transition to specified states. The timeline process initiates a set of actions based on a clock/calendar time. The schedule process can include a rules engine for executing a set of conditional actions based on the state of the platform and the virtual devices at the time of execution. Each program can obtain information on the configuration and actions of other programs on the platform. As a result, overlapping, duplicative, or conflicting actions can be avoided.

Each virtual device can report state parameters, operational history, errors, configuration parameters, and the like to a server via the platform and a network cloud. The data from each virtual device can be aggregated in a device report delivered or requested periodically (e.g., every five mins.) from the edge gateway platform. The server can include a user interface (UI) to interact with users who can manipulate the configuration of virtual devices via the user interface. The server can also include an application programming interface (API) server to receive API requests from other network systems. The commands received from the UI or the API can be queued in a server command queue. The server delivers commands to the edge gateway platform via the command queue described above. The server also updates the data shown via the UI based on current data received from the edge gateway platform in the device reports.

By virtue of the processing power made available at the edge gateway, the embodiments disclosed herein provide a system that can move a high degree of the system intelligence and decision-making to the remote sites where the energy is being used and generated. As a result, the various embodiments can rely less on a central control architecture and can react more quickly and efficiently to real-time changes and events at the remote site.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, systems and methods for distributed energy services management are described herein. In one particular embodiment, the distributed energy services management system is applied in an energy network, such as the systems illustrated in FIGS. 1 through 3. However, it will be apparent to those of ordinary skill in the art that the distributed energy services management techniques described and claimed herein can be used in a variety of other applications and systems.

The various embodiments disclosed herein provide a solution for cost-effective grid-scale energy storage, generation, and management. The various embodiments combine batteries, power electronics, and generation into a highly-optimized form factor that is remotely managed and controlled by a software-as-a-service (SAAS) platform. The software platform of an example embodiment aggregates systems together in a real-time network for the delivery of both energy and information. The resulting "energy cloud" pools and dynamically scales energy resources across the grid upon demand. Multiple applications can be delivered to multiple customer segments from this single platform. Generation and storage are controlled by a value-optimizing process that determines when and where energy should be delivered. Systems can be deployed anywhere on the grid where needed. Each system is sized according to the specific needs of the customer and the site, minimizing component and installation costs. The services provided by the various embodiments deliver value by enabling utilities, energy consumers, and third parties to buy and sell energy, each according to their unique economic interest.

Conventional systems do not configure an energy management system that is placed in part behind the meter (e.g., between the meter and site loads) at a particular site, wherein the energy usage and generation at the site can be aggregated, pooled, and dispatched through multiple applications that can be delivered simultaneously to both the utility/grid operator and the site owner/customer. The unique combination of elements in the various embodiments disclosed herein, enable distributed, localized, aggregated, and virtualized control of energy for the electricity industry. The system can deliver power to utilities and energy consumers in ways that maximize avoided costs, ensure energy reliability, and accelerate the integration of renewable energies and electric vehicles.

Figure 1:
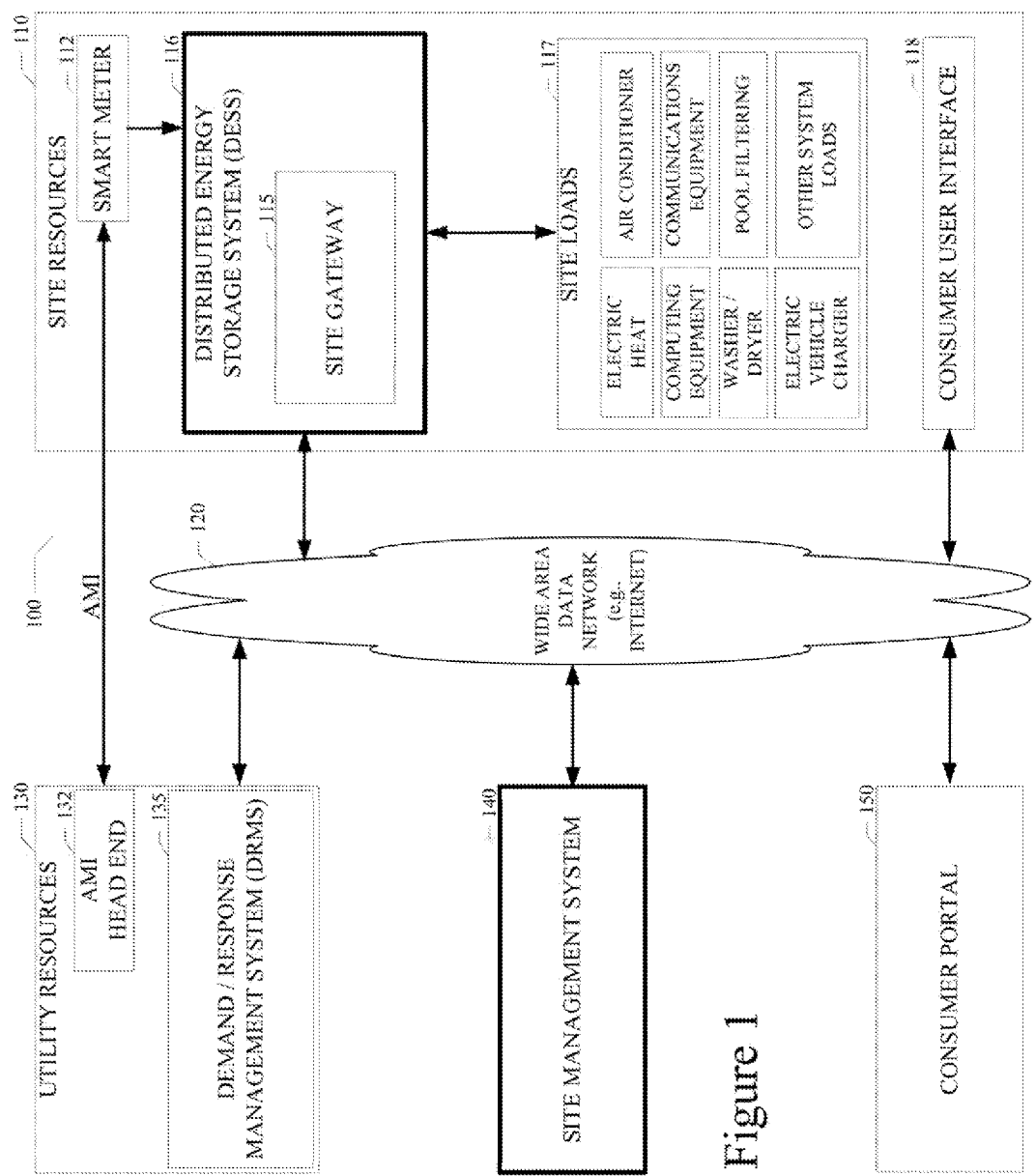
FIG. 1 illustrates a block diagram of an example distributed energy services management system in which embodiments described herein may be implemented.

Referring now to FIG. 1, a block diagram of an example distributed energy services management system in which embodiments described herein may be implemented is illustrated. As shown in FIG. 1, an energy ecosystem 100 represents a cloud-services delivery model for energy. The ecosystem 100 in which the example embodiments are implemented includes a site including a set of site resources 110. The site can correspond to a residential or commercial location at which various site loads 117 are provided. Site loads 117 correspond to various devices or systems at the site that consume or store electrical energy at various levels. For example, site loads 117 can correspond to electrical heating devices, air conditioners, computing or communications equipment that consumes electrical energy, washers/dryers, pool filtering equipment, electrical vehicle chargers, manufacturing equipment, and other electrical system loads at a particular site.

The site resources 110 also include a conventional smart meter 112 that tracks and wirelessly transmits electrical energy usage information to a utility having various utility resources 130. A conventional smart meter is typically an electrical meter that records consumption of electric energy in intervals of an hour or less and communicates that information at least daily back to the utility for monitoring and billing purposes. Smart meters enable two-way communication between the meter and the central system at the utility. Such two-way communication can be enabled by an advanced metering infrastructure (AMI) that differs from traditional automatic meter reading (AMR) in that it enables two-way communications with the meter. One utility resource 130 is an AMI head end 132 that receives and processes the electrical energy usage information received from the smart meter 112 at the site. Another utility resource 130 is a demand/response management system (DRMS) 135 that can provide a centralized mechanism for managing the demand and supply of electrical energy to a community of sites, such as the site with site resources 110.

In an example embodiment, the ecosystem 100 includes a distributed energy storage system (DESS) 116, which includes a site gateway 115. The DESS 116 represents a system, such as the distributed energy storage and power management system disclosed in the above-referenced U.S. patent application. In particular, the DESS 116 of an example embodiment includes an energy storage module, an inverter, and a charge controller. The gateway 115 can include a system controller. The energy storage module of DESS 116 represents a battery system for electrical energy storage. In a particular embodiment, lithium-ion batteries plus a battery management system can be used. The inverter and charge controller of DESS 116 can be conventional units, such as the Schneider XW model. The system controller of gateway 115 can represent, for example, a standard Linux server that has been extended with a custom input/output (I/O) controller board that allows multiple smart energy components to be plugged in or otherwise electrically connected. One such smart energy component is a CT Sensor system that monitors site energy demand in real-time. The multiple smart energy components can use data communication technologies, such as WiFi, cellular, Zigbee, etc. Plugging in multiple communication technologies allows each component to integrate and control other distributed energy resources (e.g. electric vehicles, batteries, or other loads) at the site. The DESS 116 components (e.g., the energy storage module, the inverter, and the charge controller) and the gateway 115 (e.g., the system controller) can all be connected via a CAN (Controller Area Network) Bus network or other well-known data communication technologies. Direct integrations with both the inverter/charge controller and the energy storage module give the gateway 115 fine-grained control over those components. The inverter/charge controller and the energy storage module are wired on a common DC bus within the DESS 116. This enables direct control of energy generation that can be both stored in the batteries (directly as DC, without the efficiency loss of converting to AC) and converted to AC and dispatched to the grid. The DESS 116 is designed for ease of installation. Energy generation systems (e.g., solar arrays) can be connected to the DESS 116 through a single or multiple DC inputs. The energy grid can be connected to the DESS 116 through a single or multiple AC inputs. This configuration reduces the costs and complexity of the installation process, even in comparison to the installation of a traditional energy generation system.

Referring still to FIG. 1, the ecosystem 100 includes the site gateway 115 within the DESS 116. In an alternative embodiment, the site gateway 115 can be housed separately from the DESS 116. The site gateway 115 provides power and energy services at the site where it is deployed. At the same time, reserve energy from the site where the site gateway 115 is deployed can be pooled in the network cloud 120. From this 'virtualized' energy pool, customers can reserve energy in advance, and can also request energy in real-time. Operators within the ecosystem 100 can bid any remaining available energy reserves, both to third-party aggregators and into open markets for ancillary services. The site gateway 115 of an example embodiment provides cloud energy services that are constantly working to balance demands by shifting resources to where they are needed most and to optimize how energy is captured and delivered. The ecosystem 100 of an example embodiment enables utilities, energy consumers, and third parties to buy and sell energy each according to their unique economic interest. The ecosystem 100 of an example embodiment delivers multiple energy services on demand to multiple customers in real time. The site gateway 115 of an example embodiment and its cloud-resident services provider, the site management system 140, are described in more detail below.

As shown in FIG. 1, the site gateway 115, of an example embodiment, can operate in concert with the site management system 140, which is accessible to the site gateway 115 via the network cloud 120. The site gateway 115 is designed to be flexible, and to provide interoperability across and within various technologies and protocols. As described in more detail below, the site gateway 115 automatically discovers local devices, and virtualizes those devices without the use of agents. This configuration lowers the cost and complexity of integrating with other components within the ecosystem 100. In a particular embodiment, the site gateway 115 is integrated with the DESS 116. This integration enables the site gateway 115 to directly monitor and control the inverter/charge controller and the energy storage module of the DESS 116. The combination of the site gateway 115 and the DESS 116 provides a site resident energy management system that is empowered to make intelligent decisions at the local (site) level, yet is controllable via devices through the network cloud 120 as described in more detail below.

The site management system 140 is also designed to be flexible and scalable from the ground up. The site management system 140 provides a base set of services, including: 1) remote management and upgrades of local software running in each site gateway 115. System health is monitored, and adverse events are captured and reported; 2) remote monitoring of the operational state of the components (physical devices) at the site, and remote metering of the power flows and stored energy at each site. Each site gateway 115 reports its complete set of operational data to the site management system 140 at periodic intervals (e.g., every four seconds, a setting that can be configured); 3) fine-grained control of the charge and dispatch of power at each site. The site gateway 115 receives commands from the site management system 140 at periodic intervals (e.g., every 500 milliseconds, a setting that can be configured) utilizing a pull model; 4) scheduled control of charge and dispatch based on time of day and state of charge in the battery. These site management system 140 services allow the ecosystem 100 to aggregate the power and energy capacity in each and every site gateway 115 at a variety of sites in a distributed community.

The services provided by the site management system 140 and the site gateway 115 enable the ecosystem 100 to maximize the value of each unit of energy dispatched from each site gateway 115 by means of intelligent decision-making at the local (site) level. Unlike conventional centrally-controlled systems, the site management system 140 of an example embodiment can delegate many of these intelligent decision-making responsibilities and related site-specific policy implementations to the site gateway 115. The site gateway 115 can use its own local resources to implement many of the decisions, services, and policies for managing energy consumption and generation both locally and in the ecosystem 100 based upon at least the following inputs:

The current cost of energy;
The efficiency of internal components (the inverter, the charge controller, the battery, etc.);
Maximum and minimum charge and discharge rates;
Energy reserved by other applications;
Available battery capacity;
The marginal cost of each battery cycle, which can change over time and is a complex calculation;
Load and generation profiles unique to each site;
Energy demand tariffs at the site;
Current and forecast weather conditions;
Historical analysis, predictive modeling, and real-time networked awareness of the entire system;
Retail and wholesale prices for energy;

Values for delivery of specific applications such as Demand Response, Regulation, or Power Quality (Volt/VAR);

Flexible integration of data from multiple channels: direct metered sensor input, utilities and third party systems, integrations with partner applications; and Data for capacity pooling, scheduling, and bidding to automate the market interfaces for the site management system 140 services.

Referring still to FIG. 1, a consumer user interface 118 is provided as a site resource 110 to enable a user to interact with the consumer user interface 118 at the site via as consumer portal 150 and the network 120. The consumer portal 150 provides a web-enabled presence for monitoring or controlling operational parameters at the site from a consumer device via the network 120.

Figure 2A:
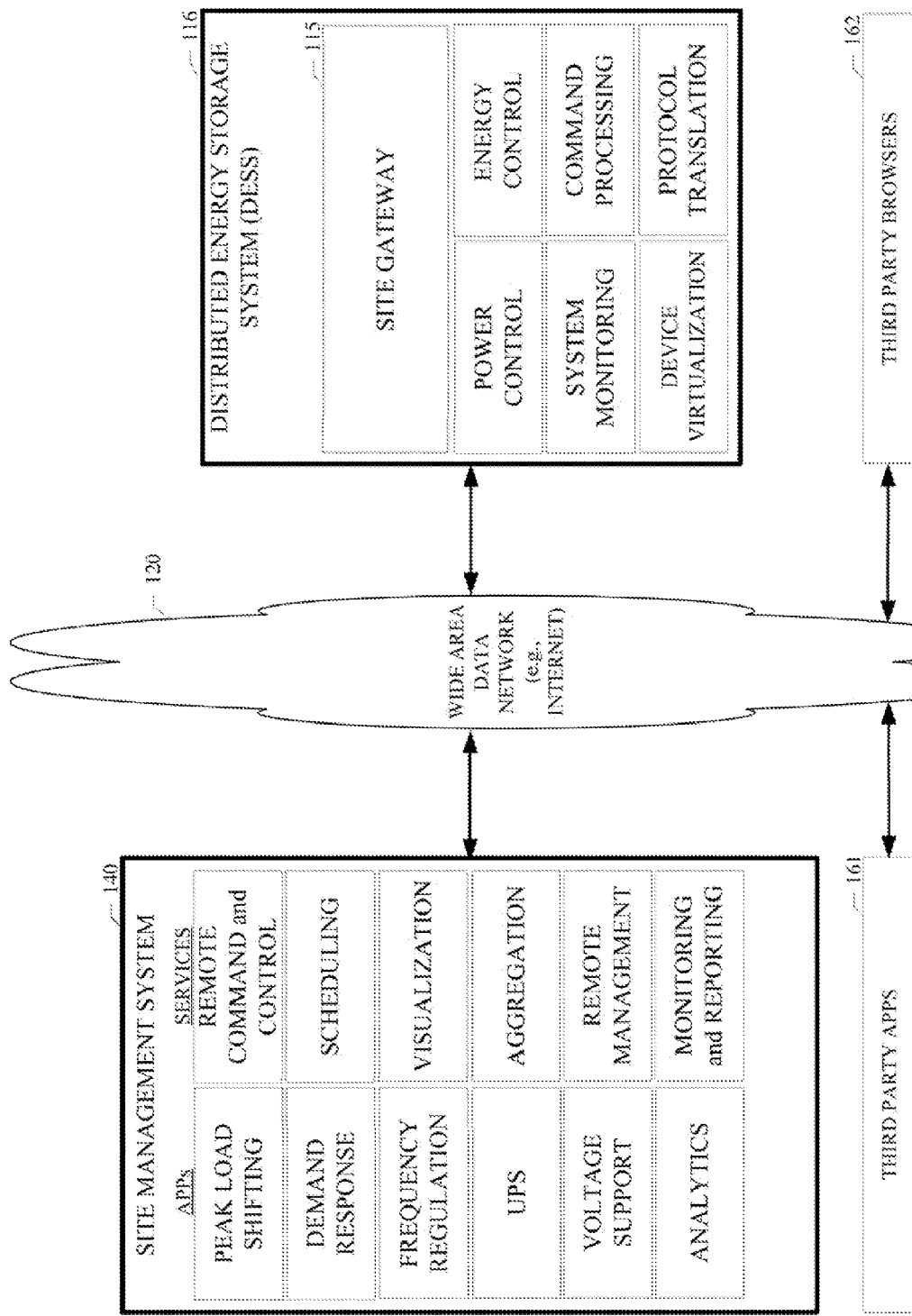
FIGS. 2A and 2B illustrate details of platform systems of example embodiments.
Figure 2B:
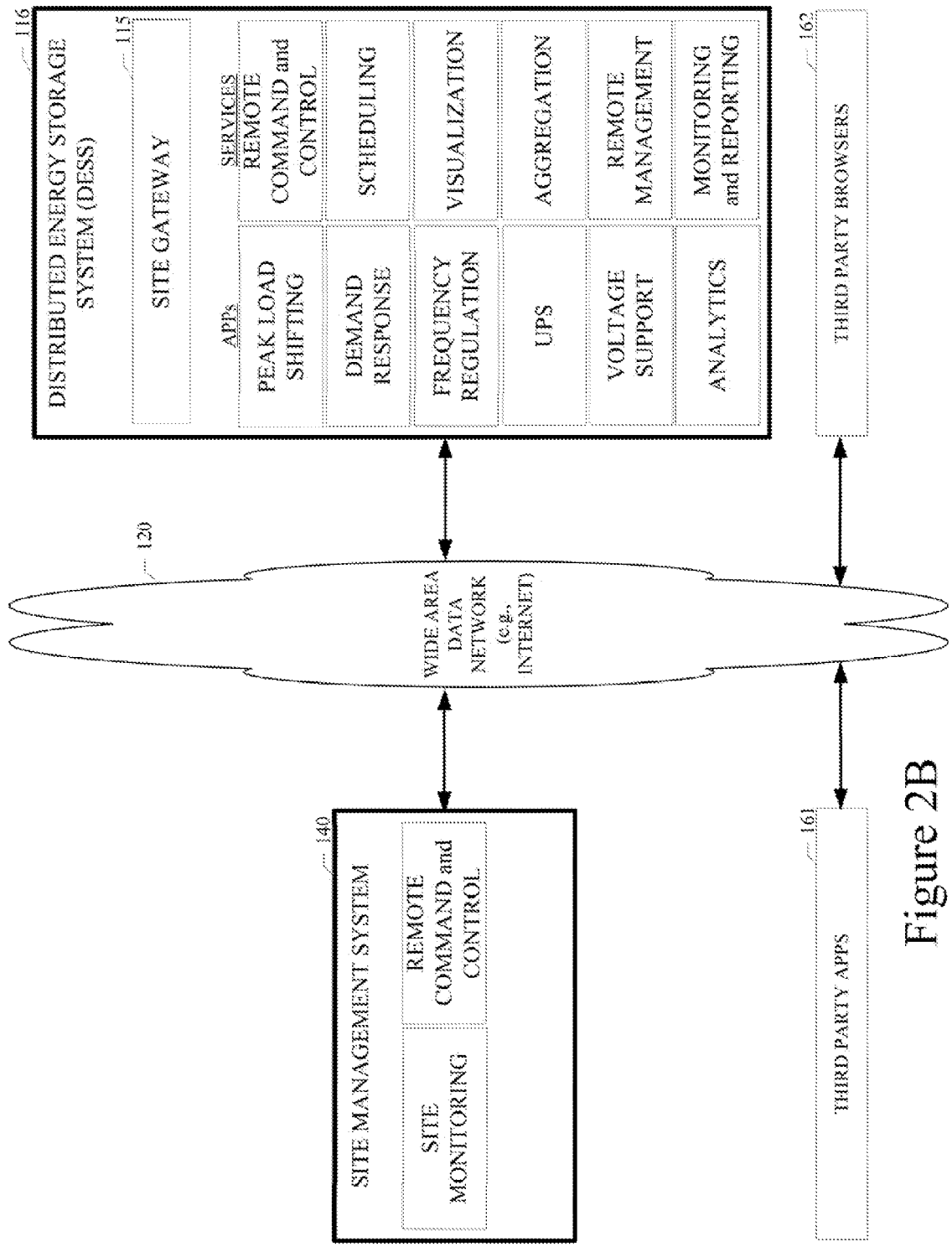

Referring now to FIGS. 2A and 2B, the diagrams illustrate details of various implementations of a platform system of two example embodiments. The example embodiment shown in FIG. 2A reflects an implementation wherein much of the energy management intelligence (in the form of various applications and services) is maintained at the site management system 140. The implementation of FIG. 2A represents a model that uses the site management system 140 as a central controller for managing a plurality of site gateways 115. Although the central control architecture of FIG. 2A may be suitable in some circumstances, many other situations require a more distributed decision-making capability. As such, the example embodiment shown in FIG. 2B reflects an implementation wherein much of the energy management intelligence (in the form of various applications and services) is maintained at the site gateway 115 as a site resident system. In the more distributed architecture shown in FIG. 2B, the site management system 140 can push much of the software and rule logic implementing the various applications and services to the site gateway 115 for execution locally at the site. In this distributed system architecture, the site management system 140 acts more as a monitor and command dispatcher, rather than as central controller. Other alternative system architectures can also be implemented wherein the software and rule logic implementing the various applications and services can be split between the site management system 140 and the site gateway 115. In this alternative system architecture, the site management system 140 implements a portion of each application or service and the site gateway 115 implements the remaining portion of each application or service.

As described in more detail below and shown in FIGS. 2A and 2B, the site gateway 115, of an example embodiment, in combination with the site management system 140 provides a set of Smart Grid applications on top of the software platform. As described above and shown in FIGS. 2A and 2B, these Smart Grid applications can be implemented primarily on the site management system 140 as shown in FIG. 2A or implemented primarily on the site gateway 115 as shown in FIG. 2B. In a particular embodiment, these Smart Grid applications can include: Peak Load Shifting, Demand Response, Frequency Regulation, Uninterruptible Power Supply (UPS) Management, Voltage Support and Optimization, Analytics, Demand Charge Reduction, Regulation, Photovoltaic (PV) Smoothing, Reliability, and a variety of other applications. These applications are described in more detail below. In a particular embodiment, each application can be delivered as a software-as-a-service (SAAS). Each application integrates with utility and third-party systems by means of open, web-based standards, such as Extended Markup-Language (XML) and Web Services. Additionally, all of the monitoring, control, and reporting functions available in the platform can be exposed as a web-services application programming interface (API) available either or both at the site management system 140 and at the site gateway 115. This system configuration has at least two advantages: first, the system configuration provides flexibility and agility to integrate with the broadest possible range of external applications and systems. Secondly, the system configuration allows partners (and customers) to build their own services/applications on top of the platform provided by the various embodiments described herein. Moreover, application-specific protocols, such as OpenADR and DNP3, can be quickly built into platform applications and exposed through a platform API. Additionally, application end-user interfaces can be delivered over conventional Hypertext Transport Protocol (HTTP) and can be viewed on any web-enabled device.

The Smart Grid applications provided by the site management system 140 and the site gateway 115 are deployed to solve real-world problems and deliver value streams to at least two sets of parties: 1) load-serving entities such as utilities, and 2) energy consumers, such as businesses and residential homeowners. Note that one of the advantages of the various embodiments described herein is that multiple applications can be delivered to multiple parties out of the same system. In practice, therefore, deployments of distributed energy storage systems will likely combine two or more applications during standard operations.

The Smart Grid applications listed above and shown in FIGS. 2A and 2B can be divided into three categories: 1) applications that generally benefit load-serving entities, 2) applications that generally benefit energy consumers, and 3) applications that generally benefit both sets of parties. The Smart Grid applications listed above are described in more detail below in the context of the benefits provided by the particular applications. For example, applications that generally benefit load-serving entities include the following:

1. Demand Response. The system responds to Demand Response events with guaranteed dispatch of power to the grid. In cooperation with as Demand-Response Management System (DRMS) 135, site resident systems (e.g., a DESS 116 including a site gateway 115) can be aggregated as capacity, and that capacity can be dispatched by schedule or real-time command on a per need basis.

2. Ancillary Services. Through the network cloud 120, systems are connected to a regional independent service operator (ISO), and the site resident systems respond to regulation signals on a per-second basis. Requests for frequency regulation or up/down ramping are translated into precise charge and dispatch commands by the site gateway 115.

3. Voltage optimization. Site resident systems respond to needs for voltage and reactive power control by injecting or absorbing power at the place where it is needed most: nearest to the load. This is one example of why the distributed architecture described above and shown in FIG. 2B can be so beneficial in managing energy at the local level. Moreover, aggregated systems act as a fleet to provide orchestrated voltage optimization on a given circuit or feeder.

4. Renewable Generation Smoothing/Firming. Co-location and integration with renewable generation sources—solar, wind, or other—gives site resident systems direct control over the energy produced. By supplementing the intermittent nature of renewable generation with the stored energy in its battery, each site resident system can smooth the energy provided to the grid, making the site and the grid more reliable, more predictable, and more stable. In turn, the negative effects of this intermittency on the grid—thermal overload, voltage swings, and increased emissions due to increase regulation demand—are entirely avoided.

The applications that generally benefit energy consuming entities include the following:
1. Uninterruptible Power Supply. In the event of a loss of power, the site resident system can automatically isolate itself from the grid, and then deliver its own power to the site without any interruption in service or loss in power quality. Site resident systems can be wired to directly support priority loads, thereby providing energy reliability for critical services (e.g., heating, cooling, electronics, etc.).

The applications that generally benefit both load-serving entities and energy consuming entities include the following:
1. Peak Load Reduction. Site resident systems can time-shift energy generated from renewable energy generators and/or drawn from the grid to maximize peak load reduction for a home or business. Through the intelligent processes provided by the various embodiments described herein, over time the system can learn about the specific features and characteristics of the site (e.g., weather patterns, load profiles, etc.) and can make adjustments on its own. If the residence or business is on a time-of-use rate, the system will know how to minimize the cost of energy for that customer by charging batteries when prices are low and dispatching energy when prices are high.
2. Electric vehicle (EV) Charging Management. Co-Located at the particular site with EV charging stations, the site resident system can dispatch energy to offset demand spikes while EVs are charging, acting as a buffer to the grid. With direct integration to the EV charging platform, the site resident system can determine the optimum charge time while minimizing the cost of electricity to the site. An additional hardware component can enable EV "fast charging" by plugging in directly to the battery within the DESS 116, thereby reducing the total charge time from hours to minutes.
3. Demand Charge Reduction. For commercial customers that are subject to demand charges, wherein costs are pegged to the maximum amount of power consumption on as monthly basis, the site resident system can monitor real-time demand and dispatch power to ensure the sue load does not exceed the specified thresholds.
4. Analytics. Each site resident system can serve as a supervisory control and data acquisition (SCADA) or sensing node for its site location. Discrete and aggregated data delivered to utilities and grid operators can be used to assist with optimizing the operation of the grid to minimize power losses and maximize efficiency and quality across such areas as outage management, system modeling, power quality optimization, advanced distribution management, and other real-time applications. Data delivered to energy consumers shows system performance, efficiency, and energy savings.

As shown in FIGS. 2A and 2B, the site management system 140 or the site gateway 115 can support a set of services on the software platform. In a particular embodiment, these services can include: remote command and control, scheduling, visualization, aggregation, remote management, monitoring, and reporting. In an example embodiment as shown in FIG. 2A, the site gateway 115 can include additional services, such as: power control, energy control, system monitoring, command processing, device virtualization, protocol translation, and other services. These additional services can also be provided at the site gateway 115 in the distributed system architecture shown in FIG. 2B. The software environment in which these applications and services are executed on the site gateway 115 is described in more detail below.

The applications and services provided on the site management system 140 and the site gateway 115 of an example embodiment represent an energy management system. This energy management system has some powerful capabilities. For example, the energy management system can monitor the operation of the power electronics inside of each DESS 116 and its corresponding site gateway 115 to ensure the energy system at a particular site is running smoothly. Secondly, the energy management system can report on the power and energy being used and/or generated at the particular site. The reporting can include information indicative of: how much power the renewable power generators are generating, how much energy is stored in each battery, how much power is being provided to the grid and to the loads at the site. This reporting happens in real-time and can be viewed on any network-connected information or communication device from any place in the world. The energy management system can also control the operation of each DESS 116 and its corresponding site gateway 115, also in real-time. If one unit needs to charge, the energy management system can command that unit to charge. If live units on a certain circuit need to discharge, the energy management system can command those units to discharge. The energy management system of an example embodiment can mix and match these commands in any order, for any combination of devices installed throughout locations on the grid. The energy management system runs a value-optimizing process that makes charge and discharge decisions, for each unit and across multiple units, which exploit the cost and price of energy in and out of the system. The energy management system integrates with existing utility and partner applications and systems by means of open and flexible web services protocols. These remote control capabilities enable the system to have an immediate and powerful impact on the grid. As the number of distributed DESS 116 and corresponding site gateway 115 systems grow, so does the aggregated potential of the entire system.

The Smart Grid applications and services provided by the site management system 140 and the site gateway 115 as described above are deployed to manage energy usage and value given a number or factors in the operating environment. These factors can include the following:

Costs and constraints. The current cost of energy, whether from the grid or from other generation sources, is a starting point. Constraints such as the efficiency of internal components (e.g., the inverter, the charge controller, the battery, etc.), maximum and minimum charge and discharge rates, energy reserved by other applications, and available battery capacity are also factored. Most importantly, the marginal cost of each battery cycle is calculated. Given that battery cycle life changes over time under the influence of usage scenarios and environmental factors, this calculation is complex, yet is required in order to extract the maximum economic value of each cycle throughout the overall life of the battery.

Optimizing factors. Load and generation profiles are each uniquely associated to a specific location. Understanding of the dynamics of these two profiles, combined with the energy tariff at the site (e.g., the variable rates of energy and demand charges levied by the energy provider), determines the exact times when dispatched energy has the most potential value. Historical analysis, predictive modeling, and real-time networked awareness of the entire system contribute to this dynamic understanding.

Prices. Retail and wholesale prices represent the current market value for energy. Values for delivery of specific applications such as Demand Response, Regulation, or Power Quality (Volt/VAR), either drawn from the open market or through negotiated contracts with purchasers, can also be available and represent the highest price paid for energy dispatch. The site resident systems can receive these inputs from multiple channels, direct metered sensor input, process data from utilities and third parties, and integrate with partner applications to configure the operation of a particular site at a particular time depending on the specifics of the site deployment and the current market conditions.

The Smart Grid applications and services provided by the various embodiments described herein can perform a detailed analysis of these and other factors to determine: when, how much, how long, and to or from which resources the site resident system should charge or dispatch energy. The result is that the value of each unit of energy dispatched is maximized, ensuring the maximum possible return on investment over time. In particular, the various embodiments provide several advantages over existing systems. These advantages include the following:

Optimization. The various embodiments enable a user to size and scale the battery, inverter, and power generation system according to the needs of the site in a utility-grade form-factor.

Localization. The site resident system units are strategically placed at the site on the grid where power and energy are most needed.

Aggregation. The capacity of multiple site resident system units is combined and managed as one resource to provide grid-scale impact.

Automation. The software platform in an example embodiment maximizes the value of energy and power services by intelligent and automated charge and dispatch.

Virtualization. The various embodiments can pool available battery capacity into energy resources that can be reserved, allocated, and scaled to meet demand.

Integration. Applications and data are delivered over the web and integrated with external systems by means of open standards.

Figure 3:
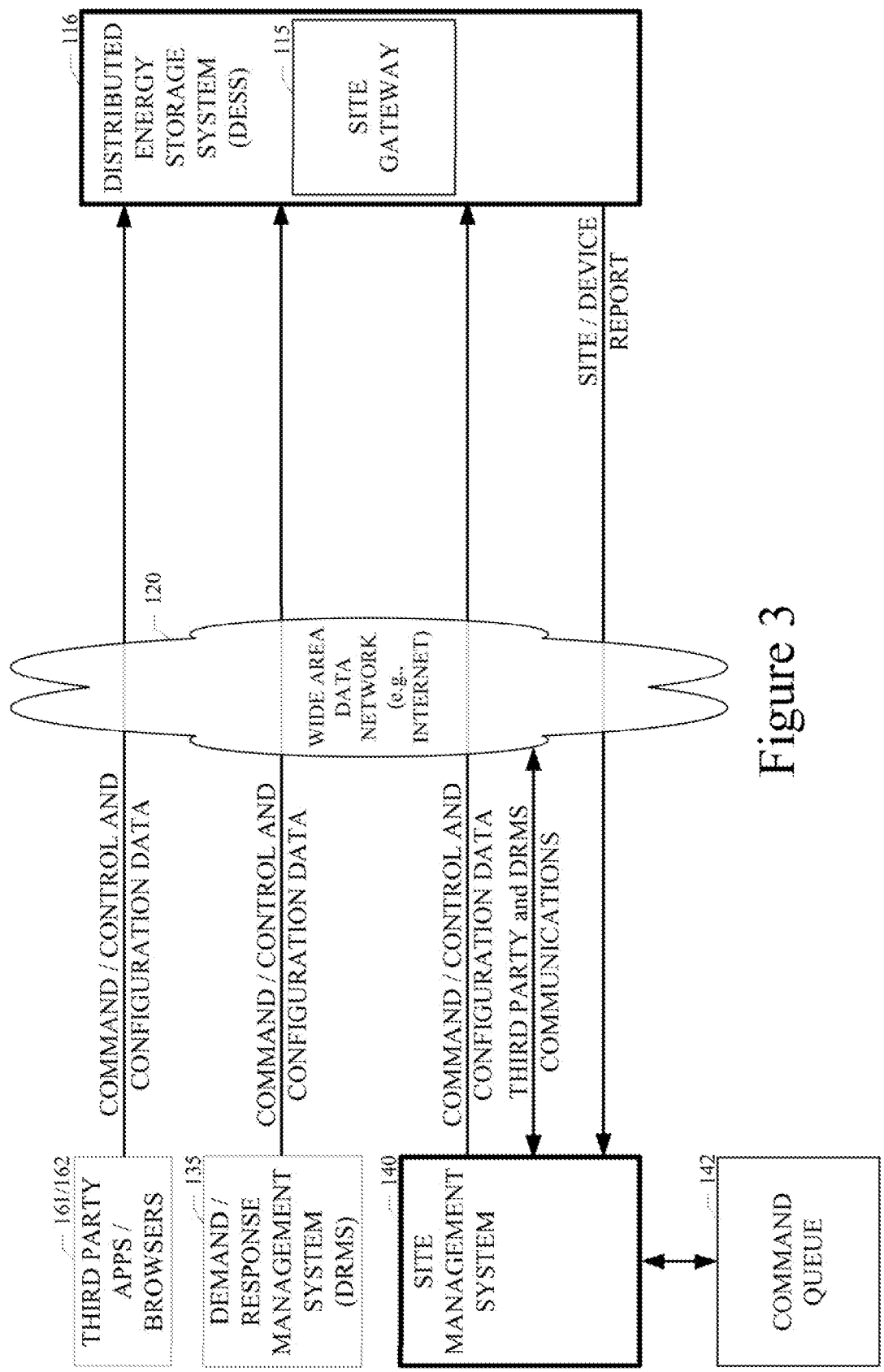
FIG. 3 illustrates a detail of the input received by a distributed energy storage system (DESS) including the site gateway in a particular embodiment.

Referring now to FIG. 3, the diagram illustrates as detail of the input received by a site gateway 115 of a DESS 116 in a particular embodiment. As described above, the site resident system, including site gateway 115, is an important part of the ecosystem 100 for supporting the applications and services described above. In support of these applications and services, the site gateway 115 is configured to receive and process command/control and configuration data from a variety of sources via the network cloud 120. In an example embodiment, these command/control and configuration data sources can include the site management system 140, the DRMS 135, and third party sources 161 and/or 162, such as energy monitoring or control systems using browsers or mobile devices. Each of these command/control and configuration data sources may need to monitor or control the operation of the energy consumption or generation at a particular site. The DESS 116 and its corresponding site gateway 115, located at the site, are needed to provide this site-resident support for effecting the monitoring and control commands sent by any of the network-resident command/control and configuration data sources. As described in more detail below, each of these command/control and configuration data commands are received and processed by the site gateway 115 in cooperation with the corresponding DESS 116.

In an alternative embodiment, the DRMS 135 and the third party sources 161 and/or 162 can issue command/control and configuration data commands for a particular site via the site management system 140. The site management system 140 can use a command queue 142 to store and marshal the commands for a particular site and forward the commands to the site gateway 115 at the particular site.

At periodic intervals (e.g., every four seconds, the interval being a configurable parameter), the site gateway 115 at each site gathers configuration and status data for each of the energy devices at the site. This configuration and status data can be used internally by the site gateway 115 to generate trending data, to assess the operation of the energy devices at the site, to compare the energy consumption and generation at the site with desired thresholds, and to produce a new command set for driving the energy consumption and generation at the site toward desired thresholds. In this manner, the site/device status report provides a feedback loop for enabling the site gateway 115 to manage energy consumption and generation at the local level. In addition, the site gateway 115 can generate a site/device status report that can be sent to the site management system 140 via the network cloud 140. The site management system 140 can use the site/device status report from each site to generate aggregated trending data, to assess the operation of the energy devices at a community of sites, to compare the energy consumption and generation at the community of sites with desired thresholds, and to produce new command sets for driving the energy consumption and generation at particular sites toward desired thresholds. In this manner, the site/device status report provides a feedback loop for conveying site status to the site management system 140. In response to this feedback, the site management system 140 may issue a new set of command/control and configuration data commands to the site gateway 115 at the site. Note also that the feedback received by the site management system 140 from the site via the site/device status report may include a new site device configuration or status driven by commands issued by the DRMS 135 or third party sources 161 and/or 162. In this manner, the site management system 140 can monitor the operation of the site as controlled by a third party command source. Thus, in a variety of ways and from a variety of sources, the site gateway 115 can receive command/control and configuration data command sets via the network 120. The processing of these command sets at the site gateway 115 is described next.

Figure 4:
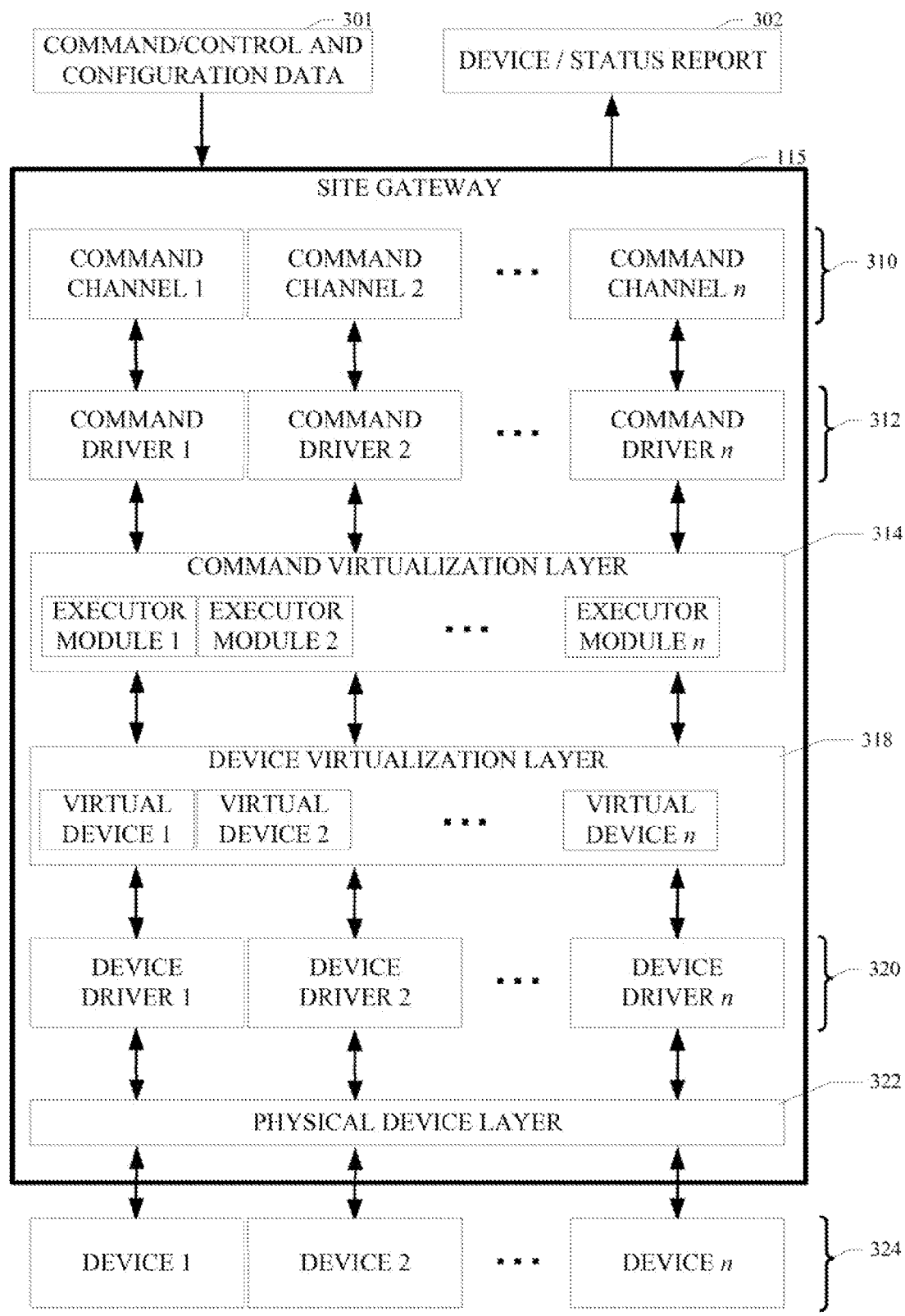
FIGS. 4 and 5 illustrate details of the internal processing structure of a site gateway of the DESS in a particular embodiment.
Figure 5:
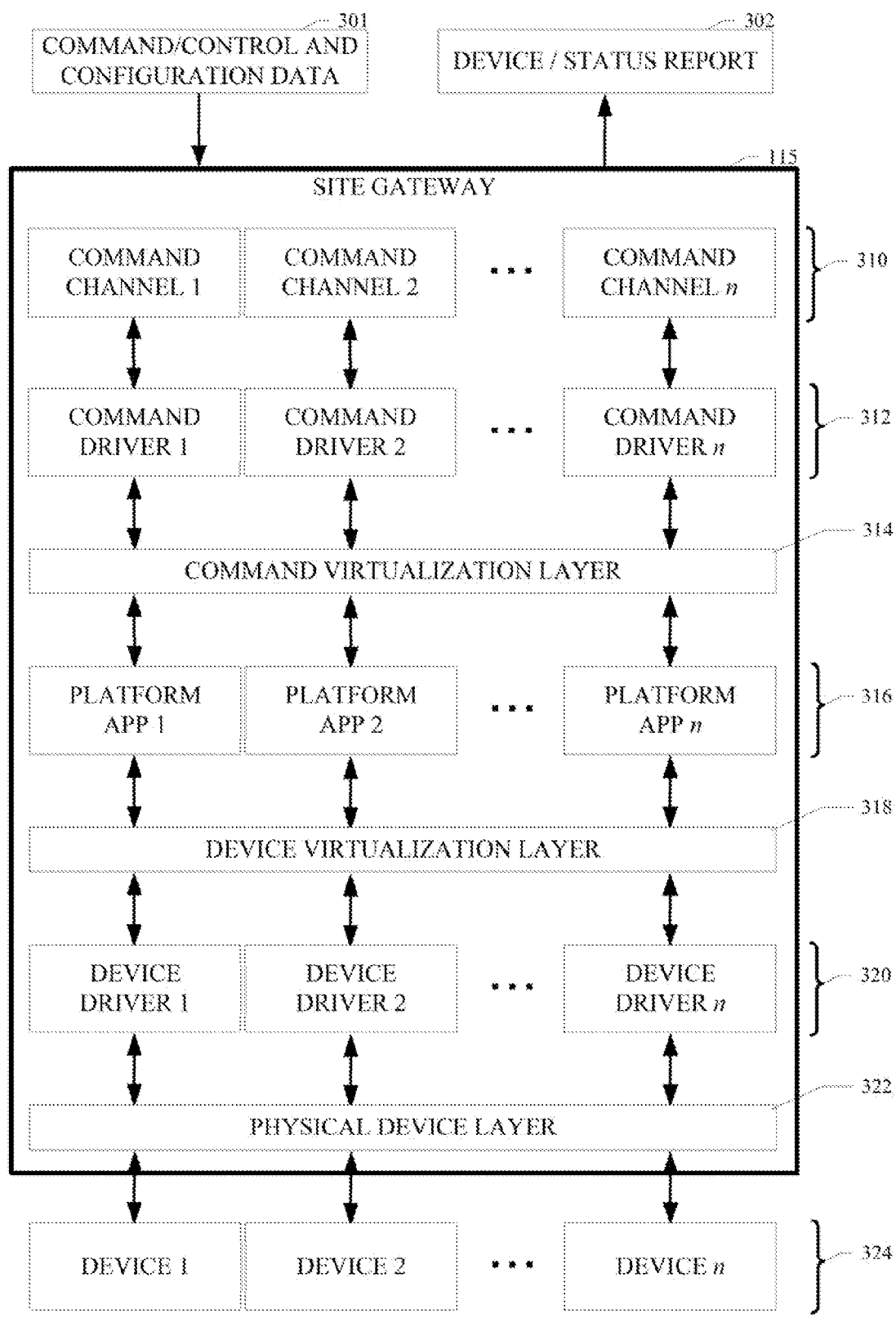

Referring now to FIGS. 4 and 5, the diagrams illustrate details of the internal processing structure of to site gateway 115 in a particular embodiment. The site gateway 115 of an example embodiment includes a programming platform or environment for receiving command/control data and configuration data commands from a variety of sources and for dynamically controlling actions and state in a plurality of physical devices at a particular site and connected to the platform via a data communications interface. In a particular embodiment, the data communications interface connecting the plurality of physical devices to the site gateway 115 can be implemented as a Controller Area Network (CAN) bus, Web services, ModBus, or other conventional data communications interface and/or protocol.

The site gateway 115 of an example embodiment can process the received command sets in at least two different ways or using at least two different processing paths. In a first processing path illustrated in FIG. 4, the site gateway 115 can use one or more executor modules of a set of executor modules running at a command virtualization layer to activate one or more virtual device(s) at a device virtualization layer. The activated virtual device(s) can control corresponding physical devices. In a second processing path illustrated in FIG. 5, the site gateway 115 can use one or more executor modules of the set of executor modules running at the command virtualization layer to activate one of a plurality of programs or platform application (apps). The programs can each implement a mode or policy in the set of virtual devices at the device virtualization layer. The activated program can then activate the one or more virtual device(s), which can control corresponding physical devices.

Referring now to FIG. 4, in the first processing path described above, a set of command channels 310 is provided on the site gateway 115 platform to receive command/control and configuration data command sets 301 from third party command sources via the network 120. The command sets 301 contain commands for driving modes, actions, and device state in the plurality of physical devices represented by a plurality of corresponding virtual device modules or virtual devices. The command channels 310 can provide an input port for commands in a particular format or protocol. As such, in an example embodiment, different command channels 310 can handle different formats or protocols. The plurality of command channels 310 are processed by one or more command translators or command drivers 312 that convert the various formats/protocols to a virtualized command in a common command format. The common command format can be used by one or more executor modules of a set of executor modules running at the command virtualization layer 314. The executor modules, operating in response to an input command, can cause execution of one or more virtual device(s) at the device virtualization layer 318. The one or more virtual device(s) at the device virtualization layer 318 correspond to the physical devices 324 at the particular site under control of the site gateway 115. Thus, the commands 301 received by the site gateway 115 can be processed by the platform of site gateway 115 shown in FIG. 4 to cause the execution of one or more virtual devices at the device virtualization layer 318 to drive a corresponding physical device 324 to a desired state, to query the state of a corresponding physical device 324, or to set configuration parameters in a corresponding physical device 324. In an example embodiment, there can be multiple executor modules at the command virtualization layer 314. The executor modules are typically command specific; however, a single command can be handled by multiple executor modules.

The virtual devices at the device virtualization layer 318 can use corresponding device drivers 320 and a physical device layer 322 to translate common format commands to control signals for driving a particular type of physical device 324 to a desired state. The virtual device can also collect status information from the physical device 324 via corresponding device drivers 320 for transfer to the network cloud 120 as part of a site/device report as described above. The virtual device(s) can communicate with the corresponding physical devices via the physical device layer 322 and a data communications interface (e.g., the CAN bus, Web service, ModBus, or equivalent). In a particular embodiment, each virtual device at the device virtualization layer 318 can execute other virtual devices. As a result, the set of virtual devices at the device virtualization layer 318 can be executed in a hierarchical fashion.

Referring now to FIG. 5, in the second processing path described above, the set of command channels 310 is provided on the site gateway 115 platform to receive command/control and configuration data command sets 301 from third party command sources via the network 120. As described above, the plurality of command channels 310 are processed by one or more command translators or command drivers 312 that convert the various formats/protocols to a virtualized command in a common command format. The common command format can be used by one or more executor modules of a set of executor modules running at the command virtualization layer 314. The executor modules, operating in response to an input command, can cause execution of one or more programs or platform application (apps) 316 as shown in FIG. 5. The example embodiment of the platform of site gateway 115 as shown in FIG. 5 can include a plurality of programs or platform application (apps) 316, which are installable and configurable on the platform of site gateway 115. The programs 316 can each implement a mode or policy in the set of virtual devices at the device virtualization layer 318. Programs can interact directly with the virtual devices. Each program can cause one or more corresponding virtual device(s) to implement the corresponding mode. The execution of a particular executor module in response to an input command 301 can trigger the activation of a corresponding program 316. Similarly, the activation of a virtual device can trigger the activation of a corresponding program 316. The activation or deactivation of particular programs 316 can also be configured to occur on a periodic, timed, or scheduled basis. As a result, programs 316 can be used on the platform to implement particular modes or policies in one or more virtual device. The programs 316 can each be assigned a configurable unique priority relative to other programs 316. As a result, an action by a lower priority program 316 can be pre-empted by a higher priority program 316. In general, however, the plurality of programs 316 is scheduled for execution in priority order. By providing a prioritized set of programs 316 on the platform, an example embodiment can conveniently and dynamically change the operation of the energy management system at the site gateway 115. For example, particular programs 316 can be used to configure the physical devices 324 to operate in an energy-conserving manner during a time when grid power costs are high. When grid power costs decrease below a configured threshold, a new set of programs 316 can be dynamically activated to configure the physical devices 324 to operate in an energy-storage or energy-generation mode.

In one embodiment, each program 316 can be configurably assigned to a specified portion of a resource in a corresponding DESS 116, such as a battery. For example, a program 316 (e.g., Program A) can be assigned to a 40% portion of a battery in DESS 116. Given this assignment, the actions of other programs 316 cannot affect the 40% of the battery assigned to Program A. If a resource is not fully allocated (e.g., 40% is assigned to Program A and 10% is assigned to Program B), any program 316 can use the unallocated capacity of the resource. As a result, if Program A is assigned 40% of the battery and Program B is assigned 10% of the battery, Program A can affect 90% of the battery (e.g., 40% assigned to Program A plus the unassigned 50%), Program B can affect 60% of the battery (e.g., 10% assigned to Program B plus the unassigned 50%), and other programs 316 can only affect the unassigned 50% of the battery. Moreover, a particular embodiment is further configured to enable assignment or reservation of the individual capacities of a resource. For example, a particular resource, such as a battery in DESS 116, may have a charge capacity and a discharge capacity. An example embodiment can be configured to enable a particular program 316, such as Program A, to reserve a portion (e.g., 40%) of the discharge capacity of the resource, but separately none (or some, or all) of the charge capacity of the resource. This feature of the example embodiment allows for a program 316 to reserve a portion of the discharge capacity of a resource, while allowing other programs 316 to separately reserve a portion of the charge capacity of the resource. The interaction between programs 316 with resource capacity reservations is implemented in the same manner as the interaction between programs 316 with resource reservations as described above. The partial resource and resource capacity allocation feature of an example embodiment enables the scope of program 316 operation to be configurable and controllable. As a result, the scope of programs 316 and the degree to which these programs 316 can control physical devices 324 on the site can be tightly and configurably controlled.

In addition, in one embodiment, each program 316 can also be associated with a particular external entity, or a combination thereof. For example, a program 316 can be associated with a consumer, a site owner, a unit operator, a utility, a component supplier, or other external entity or a combination thereof. As a result, the set of programs 316 operating on the platform of site gateway 115, and the collective operational activity of these programs 316, can be grouped by the associated external entities. Thus, modes or policies can be applied to the operation of the physical devices 324 based on an associated external entity.

Each program 316 can implement a mode or policy in the set of virtual devices using any of a variety of available program models. For example, the plurality of available program models can include: an override process, a sequence, a timeline, a schedule, or other program model. It will be apparent to those of ordinary skill in the art that many other program models can be provided and used. In an example embodiment, the override process sends control commands to the corresponding set of virtual devices for commanding the virtual devices to transition immediately to the specified state. The sequence process initiates a serial set of actions based on a relative time from an initial starting point in time. The set of actions include commanding the virtual devices to transition to specified states. The timeline process initiates a set of actions based on a clock/calendar time. The schedule process can include a rules engine for executing a set of conditional actions based on the state of the platform and the virtual devices at the time of execution. Each program 316 can obtain information on the configuration and actions of other programs 316 on the platform. As a result, overlapping, duplicative, or conflicting actions can be avoided.

Each virtual device can report state parameters, operational history, errors, configuration parameters, and the like to the site gateway 115 and the site management system 140 via the device/status report 302 and the network cloud 120. The data from each virtual device can be aggregated in the device/status report 302, which can be delivered or requested periodically (e.g., every five minutes) from the site gateway 115 platform. The site gateway 115 and the site management system 140 can include a user interface (UI) to interact with authorized users who can manipulate the configuration of virtual devices and/or programs 316 on the site gateway 115 via the user interface. Alternatively, a network-accessible consumer portal 150 can be provided and used with a consumer user interface 118 to enable authorized users to manipulate the configuration of virtual devices and/or programs 316 on the site gateway 115. The site management system 140 can also include an application programming interface (API) server to receive API requests from other network systems. The commands received from the UI or the API can be queued in a server command queue 142. The site management system 140 can deliver commands to the site gateway 115 platform via the command input mechanism described above. The site management system 140 can also update the data shown via the UI based on current data received from the site gateway 115 platform in the site/device reports 302.

Figure 6:
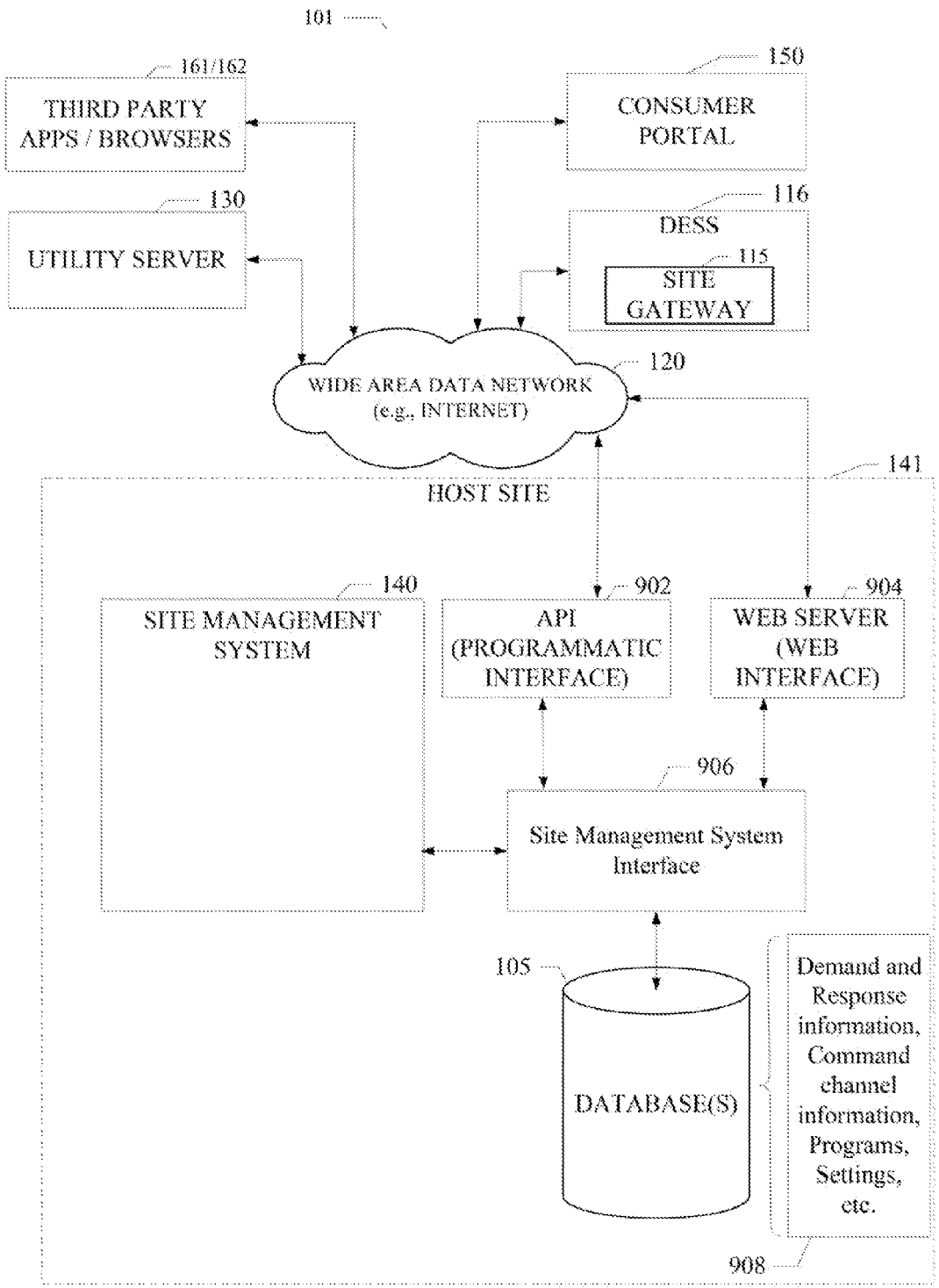
FIG. 6 illustrates a block diagram of an alternative example of a distributed energy services management system in which embodiments described herein may be implemented.

Referring now to FIG. 6, the diagram illustrates a block diagram of an alternative example of a distributed energy services management system 101 in which embodiments described herein may be implemented. In the embodiment illustrated, a host site 110 is shown to include the site management system 140 as described above. In a particular embodiment, the host site 110 may also include a web server 904 having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the site management system 140 either directly or via an interface 906. The site management system 140 may also be configured to access and use a data storage device 105 either directly or via the interface 906.

In an example embodiment as described herein, the system of one embodiment is configured to: receive a command stream from a network-based energy management system; perform command virtualization on the received command stream; identify one or more devices corresponding to the virtualized command stream; activate one or more platform apps (e.g., programs) corresponding to the identified devices; and use the one or more platform apps (e.g., programs) to virtualize the identified devices, to identify corresponding device drivers, and to configure physical devices corresponding to the virtualized devices.

Figure 7:
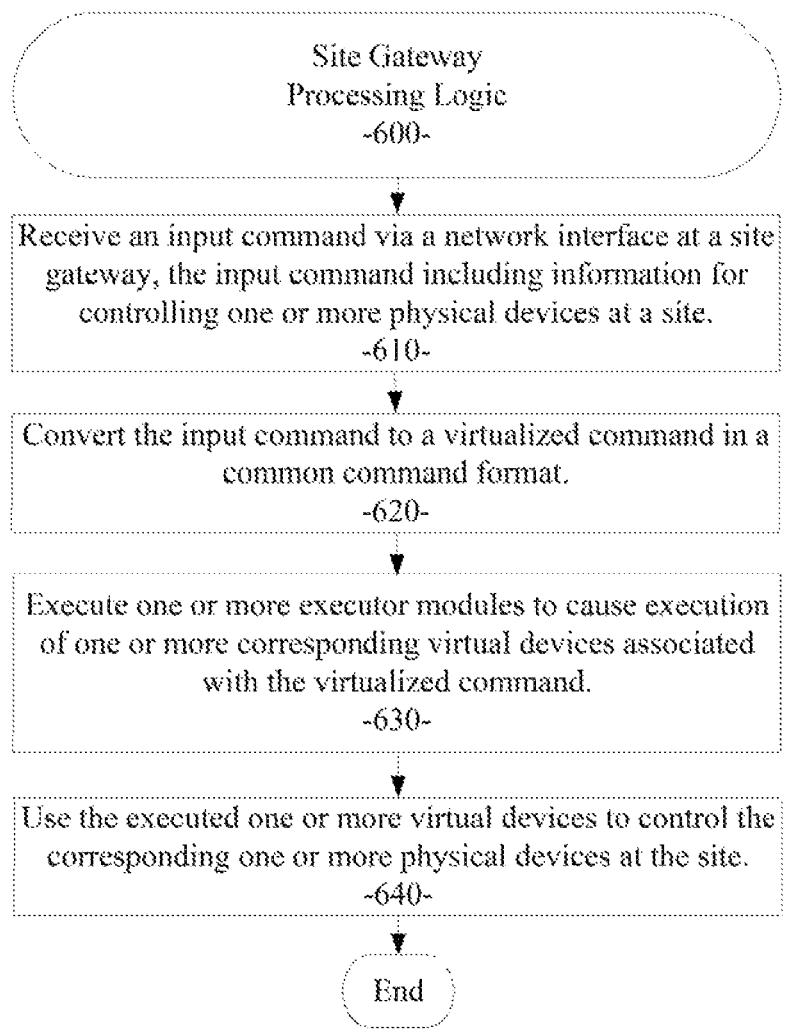
FIGS. 7 and 8 are processing flow charts illustrating example embodiments of a system and method for distributed energy services management as described herein.

FIG. 7 is a processing flow diagram illustrating an example embodiment of a method 600 for distributed energy services management as described herein. The method 600 of an example embodiment includes: receiving an input command via a network interface at a site gateway, the input command including information for controlling one or more physical devices at a site (processing block 610); converting, by use of a data processor, the input command to a virtualized command in a common command format (processing block 620); executing, by use of the data processor, one or more executor modules to cause execution of one or more corresponding virtual devices associated with the virtualized command (processing block 630); and using the executed one or more virtual devices to control the corresponding one or more physical devices at the site (processing block 640).

Figure 8:
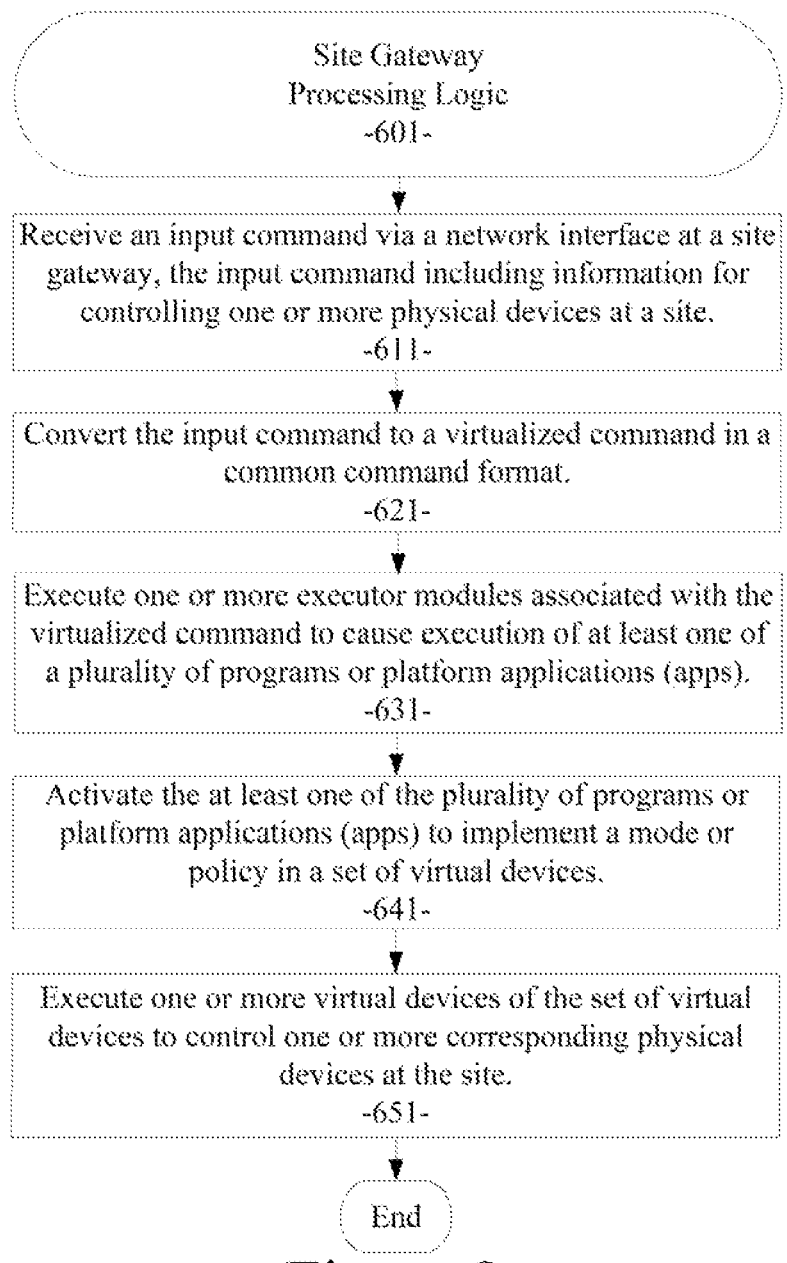

FIG. 8 is a processing flow diagram illustrating an example embodiment of a method 601 for distributed energy services management as described herein. The method 601 of an example embodiment includes: receiving an input command via a network interface at a site gateway, the input command including information for controlling one or more physical devices at a site (processing block 611); converting, by use of a data processor, the input command to a virtualized command in a common command format (processing block 621); executing, by use of the data processor, one or more executor modules associated with the virtualized command to cause execution of at least one of a plurality of programs or platform applications (apps) (processing block 631); activating, by use of the data processor, the at least one of the plurality of programs or platform applications (apps) to implement a mode or policy in a set of virtual devices (processing block 641); and executing one or more virtual devices of the set of virtual devices to control one or more corresponding physical devices at the site (processing block 651).

Figure 9:
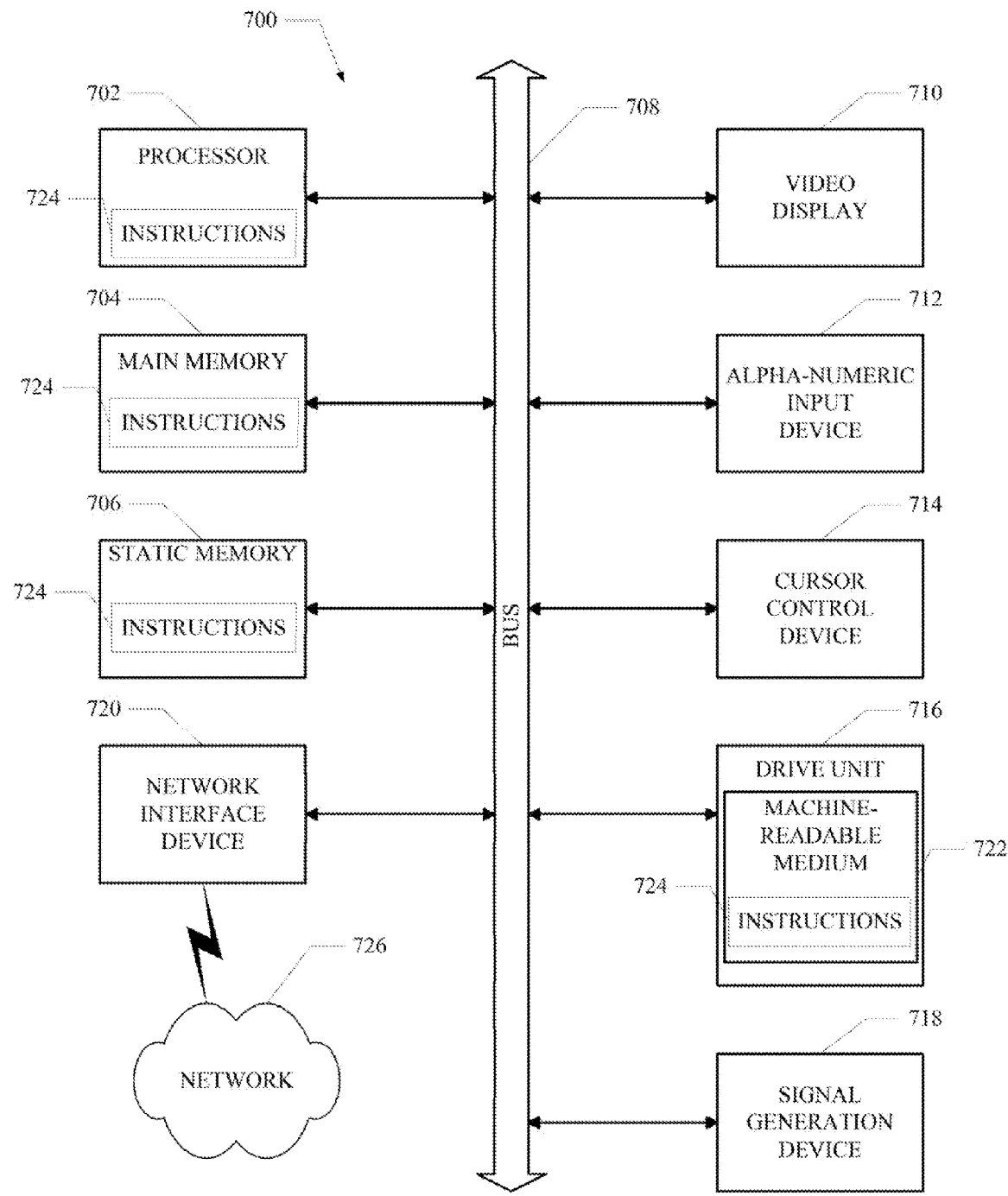
FIG. 9 shows a diagrammatic representation of machine in the example form of a computer system within which a set of instructions when executed may cause the machine to perform any one or more of the methodologies discussed herein.

FIG. 9 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, as set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method for distributed energy services management, having one or more processors coupled to memory in a computer system to perform the following steps in any order, comprising:

receiving an input command via a network interface at a site gateway, the input command including information for controlling one or more physical devices at a premise user site including one or more executor modules of a set of executor modules running at a command virtualization layer to activate one or more virtual devices at a device virtualization layer, wherein one or more activated virtual devices can control one or more corresponding physical devices, and wherein the site gateway can use one or more executor modules of the set of executor modules running at the command virtualization layer to activate one of a plurality of programs or platform applications wherein the one or more activated programs can then activate the one or more virtual devices, which can control the one or more corresponding physical devices providing one or more power and energy services to a user to balance demands by shifting one or more energy resources to where they are needed most, wherein the one or more corresponding physical devices include at least one inverter to store at least a portion of reserve energy locally generated at the premise user site within an integrated storage appliance of a distributed energy storage system (DESS) that has been extended with an input/output (I/O) controller board that allows multiple energy components to be electrically connected internally within the DESS apparatus, including at least one of a current transfer sensor system that monitors local user site energy demand in real-time, and at least one energy component using an internal data communication protocol to communicate with an energy storage module, inverter, charge controller and a site gateway connected via a common bus network, and to enable direct control of locally created energy generation that can be both stored in the batteries and dispatched to the grid, and wherein the site gateway automatically discovers local devices, and virtualizes those devices without the use of agents, wherein the distributed energy storage system, integrated storage appliance, and site gateway are housed in a common enclosure to form a site management system for one or more consumers that is located between a utility grid smart meter, and one or more renewable energy generation sources, and one or more user site loads, wherein both the one or more renewable energy sources and one or more user site loads connect to the user side of the site management system, and wherein a portion of said reserve energy is capable of being pooled in a virtualized energy pool;

converting, by use of a data processor, the input command to a virtualized command in a common command format;

executing, by use of the data processor, one or more executor modules to cause execution of one or more corresponding virtual devices associated with the virtualized command; and using the one or more corresponding virtual devices associated with the virtualized command to control the corresponding one or more physical devices at the site; and providing an energy area network for controlling and monitoring one or more user loads and corresponding energy consumption, executing the one or more executor modules to cause execution of at least one of a plurality of programs or platform applications, wherein the platform application is accessed via a wireless network mobile software application, using the one or more corresponding virtual devices associated with the virtualized command to control the corresponding one or more physical devices at the site, and wherein the one or more corresponding virtual devices associated with the virtualized command are associated with the wireless network mobile software application wherein the energy area network is a home area network configured to monitor and control one or more user appliances via a consumer web portal to compare the energy consumption and generation with desired thresholds, and to produce new command sets for driving the energy consumption and generation toward desired thresholds from the user site.

2. The method of claim 1, further comprising:
using the one or more corresponding virtual devices associated with the virtualized command to control the corresponding one or more physical devices at the site, wherein one of a plurality of programs or platform applications including one or more computer programs that can each implement a mode or policy in the set of virtual devices at the device virtualization layer, wherein the one or more activated programs can then activate the one or more virtual devices, which can control the one or more corresponding physical devices providing one or more power and energy services to a user by controlling one or more components of the distributed energy services system to store and distribute reserve energy at the premise user site within an integrated storage appliance; and using the one or more virtual devices to collect status information from the one or more physical devices at the site via a corresponding device driver to aggregate data from a network of one or more inverters within one or more distributed energy services systems to distribute reserve energy via a distributed software architecture and virtual energy cloud.

3. The method as claimed in claim 2 wherein the one of a plurality of programs or platform applications are installable and configurable at the site gateway.

4. The method as claimed in claim 3 wherein the one of a plurality of programs or platform applications are assigned a configurable unique priority relative to other programs.

5. The method of claim 4 wherein the one of a plurality of programs or platform applications is configured to a site management system resource portion and a site gateway resource portion, wherein a site management system resource portion and one or more site gateway resource portions combine to equal an entire resource allocation configured from one of a plurality of programs or platform applications to form one or more resource reservations and to adjust a required amount of grid energy for the site management system.

6. The method as claimed in claim 5 wherein the one of a plurality of programs or platform applications are configurably associated with a particular external entity.

7. The method as claimed in claim 5 wherein the one of a plurality of programs or platform applications configured to set a mode or policy in the one or more virtual devices using any of a plurality of available program models.

8. The method of claim 5, further comprising:
providing one or more hybrid inverter converters coupled to one or more charge controllers and one or more intelligent battery management systems via an electrical bus in the common enclosure of the site resident management system, and
providing one or more energy management devices and one or more site gateways configured to monitor and control the one or more energy management devices.

9. The method of claim 8, further comprising:
executing the one or more executor modules to cause execution of at least one of a plurality of programs or platform applications, wherein the platform application is accessed via a wireless network mobile software application, and
using the one or more corresponding virtual devices associated with the virtualized command to control the corresponding one or more physical devices at the site, and wherein the one or more corresponding virtual devices associated with the virtualized command are associated with the wireless network mobile software application.

10. A grid-scale distributed energy services ecosystem comprising:
a consumer user interface coupled to a central network cloud to access a consumer portal;
a site management system coupled to the network cloud;
one or more utility resources including an advanced metering infrastructure head end and a demand and response management system (DRMS), wherein the advanced metering infrastructure head end receives and processes electrical energy usage and generation information received from a smart meter coupled to a distributed energy storage system located at a site wherein power and energy services are provided to a user, and wherein the demand and response management system provides centralized management of demand and supply from a community of sites;
one or more data processors; and
a distributed energy services management system, executable by the one or more data processors, to:
receive an input command via a network interface at a site gateway, the input command including information for controlling one or more physical devices at one or more premise user sites wherein power and energy services are provided to a user, wherein reserve energy is capable of being locally generated at the one or more premise user sites and stored within an integrated storage appliance of the distributed energy storage system, wherein the distributed energy storage system, integrated storage appliance, and site gateway are housed in a common enclosure to form a site resident management system that is located between a utility grid smart meter, and one or more renewable energy generation sources, and one or more user site loads, wherein both the one or more renewable energy sources and one or more user site loads connect to the user side of the site management system, and wherein a portion of said reserve energy is pooled in a virtualized energy pool;
convert the input command to a virtualized command in a common command format;
execute one or more executor modules to cause execution of one or more corresponding virtual devices associated with the virtualized command; and use the one or more corresponding virtual devices associated with the virtualized command to control the corresponding one or more physical devices at the site to charge and discharge a specified amount of reserve energy from one or more components of one or more distributed energy services systems and one or more site gateway systems of the site management system, wherein a site management system resource portion and one or more site gateway resource portions combine to equal an entire resource allocation configured from one of a plurality of programs or platform applications to form one or more resource reservations and to adjust a required amount of grid energy for the site management system, and to balance demands by shifting one or more energy resources to where they are needed most, wherein the one or more corresponding physical devices include at least one inverter to store at least a portion of reserve energy that is locally generated at the one or more premise user sites within an integrated storage appliance of a distributed energy storage system (DESS), wherein each DESS has been extended with an input/output (I/O) intelligent controller board that allows one or more energy components to be electrically connected internally within each of the DESS apparatus, at least one of the DESS including at least one of a current transfer sensor system that monitors local user site energy demand in real-time, and at least one energy component using an internal data communication protocol to communicate with an energy storage module, inverter, charge controller and a site gateway connected via a common bus network, and to enable direct control of locally created energy generation that can be both stored in the batteries and dispatched to the grid, and wherein the site gateway automatically discovers local devices, and virtualizes those devices without the use of agents; and provide an energy area network for controlling and monitoring one or more user loads and corresponding energy consumption, execute the one or more executor modules to cause execution of at least one of a plurality of programs or platform applications, wherein the platform application is accessed via a wireless network mobile software application, use the one or more corresponding virtual devices associated with the virtualized command to control the corresponding one or more physical devices at the site, and wherein the one or more corresponding virtual devices associated with the virtualized command are associated with the wireless network mobile software application wherein the energy area network is a home area network configured to monitor and control one or more user appliances via a consumer web portal to compare the energy consumption and generation with desired thresholds, and to produce new command sets for driving the energy consumption and generation toward desired thresholds from the user site.

11. The ecosystem as claimed in claim 10 being further configured to execute the one or more executor modules to cause execution of at least one of a plurality of programs or platform applications wherein the one or more programs or platform applications are assigned a configurable unique priority relative to other programs or platform applications.

12. The ecosystem as claimed in claim 11 being further configured to use the one or more virtual devices to collect status information from the one or more physical devices at the site via a corresponding device driver.

13. The ecosystem as claimed in claim 11 wherein the one of a plurality of programs or platform applications is associated with an external entity.

14. A non-transitory machine-useable storage medium embodying instructions which, when executed by a machine, cause the machine to:

receive an input command via a network interface at a site gateway, the input command including information for controlling one or more physical devices at one or more sites including one or more executor modules of a set of executor modules running at a command virtualization layer to activate one or more virtual devices at a device virtualization layer, wherein one or more activated virtual devices can control one or more corresponding physical devices, and wherein the site gateway can use one or more executor modules of the set of executor modules running at the command virtualization layer to activate one of a plurality of programs or platform applications wherein the one or more activated programs can then activate the one or more virtual devices, which can control the one or more corresponding physical devices providing one or more power and energy services to a user, wherein reserve energy is capable of being locally generated at each premise user site and stored within an integrated storage appliance of a distributed energy storage system, wherein the distributed energy storage system, integrated storage appliance, and site gateway are housed in a common enclosure to form a site management system that is located between a utility grid smart meter, and one or more renewable energy generation sources, and one or more user site loads, wherein both the one or more renewable energy sources and one or more user site loads connect to the user side of the site management system, and wherein said reserve energy is capable of being pooled in a virtualized energy pool;

convert the input command to a virtualized command in a common command format;

execute one or more executor modules to cause execution of one or more corresponding virtual devices associated with the virtualized command;

use the executed one or more virtual devices to control the corresponding one or more physical devices at the site via one of a plurality of programs or platform applications including one or more computer programs that can each implement a mode or policy in the set of virtual devices at the device virtualization layer, wherein the one or more activated programs can then activate the one or more virtual devices, which can control the one or more corresponding physical devices providing one or more power and energy services to a user by controlling one or more components of the stand-alone distributed energy services system (DESS) apparatus to store and distribute reserve energy at the one or more premise user sites each within an integrated storage appliance site to charge and discharge a specified amount of reserve energy from one or more components of one or more distributed energy services systems and one or more site gateway systems of the site management system, wherein a site management system resource portion and one or more site gateway resource portions combine to equal an entire resource allocation configured from one of a plurality of programs or platform applications to form one or more resource reservations and to adjust a required amount of grid energy for the site management system;

use the one or more virtual devices to collect status information from the one or more physical devices at the site via a corresponding device driver to aggregate data from a distributed architecture network of one or more inverters within one or more distributed energy services systems to distribute reserve energy via a virtual energy cloud; and provide an energy area network for controlling and monitoring one or more user loads and corresponding energy consumption, execute the one or more executor modules to cause execution of at least one of a plurality of programs or platform applications, wherein the platform application is accessed via a wireless network mobile software application, use the one or more corresponding virtual devices associated with the virtualized command to control the corresponding one or more physical devices at the site, and wherein the one or more corresponding virtual devices associated with the virtualized command are associated with the wireless network mobile software application wherein the energy area network is a home area network configured to monitor and control one or more user appliances via a consumer web portal to compare the energy consumption and generation with desired thresholds, and to produce new command sets for driving the energy consumption and generation toward desired thresholds from the user site.

* * * * *